A. M. GRISWOLD.
Cultivator.
No. 83,487. Patented Oct. 27, 1868.
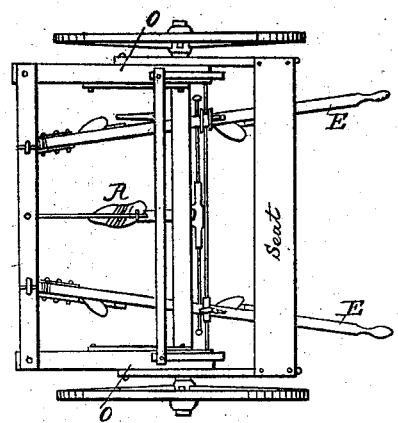
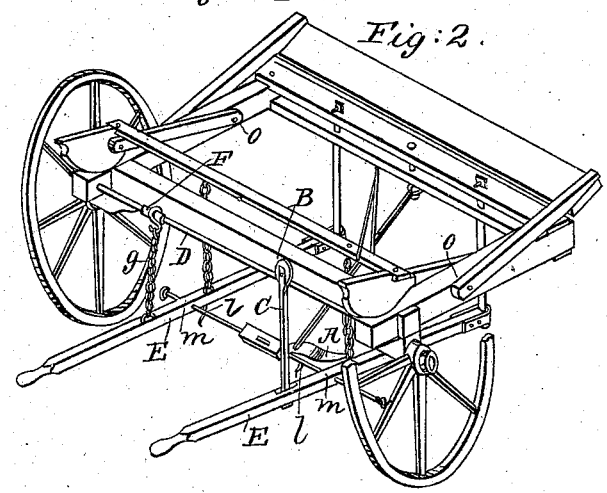

United States Patent Office.

A. M. GRISWOLD, OF MOMENCE, ILLINOIS.

*Letters Patent No. 83,487, dated October 27, 1868.*

IMPROVEMENT IN CULTIVATORS.

The Schedule referred to in these Letters Patent and making part of the same.

*To whom it may concern:*

Be it known that I, A. M. GRISWOLD, of Momence, in the county of Kankakee, and State of Illinois, have invented new and useful Improvements upon a Corn-Cultivator, patented by me July, 30, 1867; and I do hereby declare the following to be a full and exact description of the same, reference being had to the drawings that accompany and form a part of these specifications.

Figure 1 is a view of the machine as ready for work, the driver riding on the seat.

Figure 2, view with the seat thrown forward, the operator walking behind, guiding the plows by the handles e e.

Letter A, a shovel-plow or cultivator-tooth.

Letter B, a small grooved truck, held in the standards c, and rolls along the rod D, as the bars or beams E E are moved to the right or left.

Letter F, a clasp around the rod D, and running loosely thereon, having the chain g connected, so as to sustain the beam E below.

In my device, patented July 30, 1867, the beams heaving the plows hung on chains, will, when carried to the right or left, which is necessarily done when the rows are crooked, or when the team sways too much to the one side or the other, rise somewhat, which tends to lift the plows from the ground.

My improvement on this point consists in the use of the rod D and trucks B, or clasps F, for the purpose of allowing the beams E E to be moved to the right or left horizontally, without rising.

The distinguishing feature of my device at this point, is that the beams E are so arranged that both may be moved the same way, at the same time, or one in one direction, and the other in the opposite direction.

The operator walking in the rear, and holding the rear ends e e of the beams E E, which have been purposely extended, can with great ease manipulate to bring all the plows into narrower space, or spread them over wider surface.

When I operate my device in this way, the two rods t t, as shown in my former patent, are slipped out of their staples at their lower end.

I am aware that sliding frames, to aid in carrying the plows laterally, without tendency to raise them out of the soil, have been used before, but they have been such as required the different plow-beams to be moved in the same direction at the same time. (See patent of E. S. Easterday, of February 25, 1868.)

My arrangement, as already described, is entirely different from this, not only allowing the two beams E E to be moved either to the right or left, as circumstances may require, but either of them to be moved either to the right or left, without any reference to the movement of the other, or either may be moved in either direction, while the other is given no lateral motion at all.

In arranging the extra shovels A, the bars l l attach loosely to the bars E E at m m, so as to present no hindrance to the lateral movement of the bars E, as above described.

This extra shovel A becomes of great service when the machine is used for preparing the soil for the seed, and may be removed when, on using the machine to cultivate growing crops, it moves astride a row.

The seat for the operator, when he would ride, is sustained by two bars running above, and resting upon the axle, and being continued forward, are kept by bolts through them and through the sides of the frame, at O O.

On these bolts the frame of the seat may be turned over forward, as in fig. 2, when the operator would walk, and guide the plows by holding the rear or handle-ends of the beams E E, as hereinbefore described, the seat thus being out of the way.

What I claim as of my invention, and desire to secure by Letters Patent, is—

1. The trucks B, the slides F, one or both, when arranged with relation to the rod D and beams E, and to operate as and for the purposes set forth.

2. The extra shovel A, when arranged upon the beams E, substantially as described and set forth.

In testimony whereof, I have signed my name to this specification in the presence of two subscribing witnesses.

A. M. GRISWOLD.

Witnesses:
THOS. J. BUNTAIN,
Z. C. BRAYTON.